July 18, 1961

A. J. KARRELS 2,992,489

TRACKING ARM

Filed May 29, 1958

INVENTOR,
ALVIN J. KARRELS.
BY

United States Patent Office 2,992,489
Patented July 18, 1961

2,992,489
TRACKING ARM
Alvin J. Karrels, Rte. 1, Port Washington, Wis.
Filed May 29, 1958, Ser. No. 738,804
1 Claim. (Cl. 33—169)

This invention relates to balancing and indicating devices and machines, and in particular a telescoping tracking arm adjustably mounted on a machine, such as a blade balancing machine, and designed to be positioned whereby ends of a blade retained on the machine engage, or pass in close proximity to a knob carried by a horizontally disposed rod on the extended end of the telescoping arm so that the blade may be adjusted whereby one end thereof tracks or follows another end.

Although the tracking arm is described as being used for blade balancing machines it will be understood that it may also be used for wheels and other devices.

Various types of tracking devices have been used for cutting blades, propellers, wheels and the like, however, such devices require special mounting elements and machine work and fitting operations for accurate tracking are costly and consume considerable time. With this thought in mind this invention contemplates mounting a telescoping arm with a rod having a knob on the end thereof on the base of a balancing machine wherein the arm is readily adjustable in substantially all directions.

The object of this invention is, therefore, to provide a tracking arm that is readily installed on a balancing machine in which a tracking element on the end of the arm is readily positioned to indicate whether or not blades of a device on the machine are accurately tracking.

Another object of the invention is to provide a tracking arm for a blade balancing machine that may readily be installed on the balancing machine.

Another important object of the invention is to provide a tracking arm for a balancing machine in which the tracking arm is self-contained and requires no moving parts.

A further object of the invention is to provide a tracking arm for use on balancing machines in which the same arm is designed to be used for both blade and wheel balancing machines.

A still further object of the invention is to provide a tracking arm particularly designed for use on balancing machines in which the arm is of simple and economical construction.

With these and other objects and advantages in view the invention embodies an elongated telescoping arm held in a hub pivotally mounted in a bearing designed to be bolted to a base of a machine and having a rod with a knob on the extended end extended at a right angle from the lower end.

Other features and advantages of the invention will appear from the following description taken in connection with the drawings, wherein.

Figure 1:
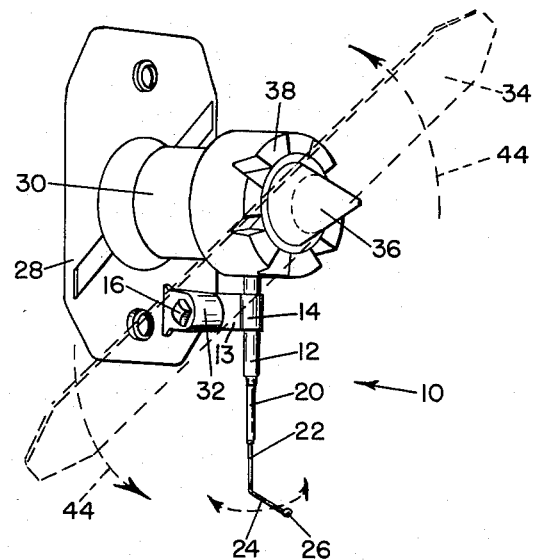
FIGURE 1 is a perspective view illustrating the position of the tracking arm on a blade balancing machine.
Figure 2:
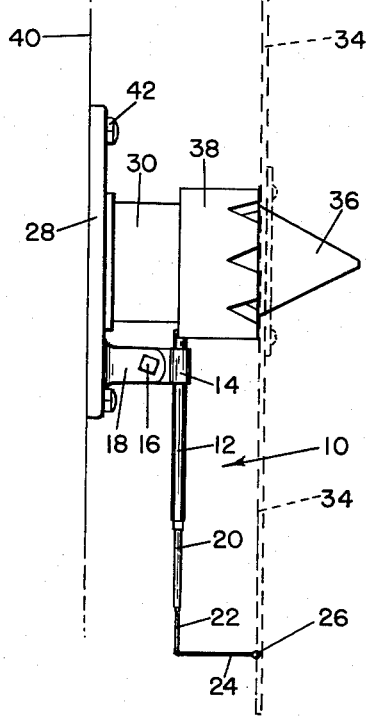
FIGURE 2 is a side elevational view of a blade balancing machine with a blade shown in broken lines thereon and showing the tracking arm depending from the base of the machine.

While one embodiment of the invention is illustrated in the above-referred-to drawings it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a tube frictionally held in a hub 14 pivotally mounted by a bolt 16 on a bearing 18, numeral 20 indicating a telescoping tube extended from the lower end of the tube 12, numeral 22 a rod having a vertical section extended from the lower end of the tube 20 and a horizontally disposed section 24 extended from the lower end of the vertical section, and numeral 26 a sighting portion or knob on the extended end of the rod 24.

In the design shown the bearing 18 extends from a base 28 of a balancer 30, and the bearing is provided with a hub 32 through which the bolt 16 extends. The hub 14 through which the tube 12 extends is provided with an arm 13 having an opening therein through which the bolt 16 extends, whereby the hub is mounted on the bolt. By this means the telescoping arm may swing about the axis of the bolt so that the knob 26 may be adjusted inwardly or outwardly to correspond with the position on a blade, such as the blade indicated by the broken lines 34, so that accurate tracking may be obtained or checked.

The blade balancer illustrated in the drawing is of the magnetic type in which a blade 34 is held on a mandrel in the form of a cone 36 by magnets 38. The balancer may be positioned on a wall 40 and secured in position by bolts 42.

It will be seen that the magnets 38 form a part of a support means for the blade, the support means being rotatably mounted on the base 28, and that the magnets form a flat surface means inasmuch as the outer surfaces of each separate magnet are disposed in a plane at a right angle to the axis of rotation of the blade support means with respect to the hub 28.

The rod 22 is frictionally held in the tube 20, whereby upon engagement of a blade with the knob 26 the knob is turned in a horizontal plane sufficiently to permit the blade to pass. By turning the wheel until the next blade arrives in this position the space between the blade and knob is determined and the blade bent one-half of this distance whereby all of the blades of a wheel or propeller are readily adjusted to pass through the same vertical plane.

Operation

In use the tracking arm is mounted to extend downwardly, as shown in the drawings, and with the parts telescoping the knob is adjusted vertically to compensate for blades or wheels of different diameters or sizes, and with the knob positioned to correspond with the end of a blade, or with any part of the blade, and as the blade is rotated, as indicated by the arrows 44, in FIGURE 1, it may readily be ascertained if the part of the blade on the opposite side of the center is tracking with the former part. By this means the blade may be ground so that it is in absolute balance, and so that similar parts on opposite sides of the center accurately track.

Blades are formed with center openings of different sizes so that they will be in different positions on the cone, and for this reason the telescoping arm swings about the center of the bolt 16 so that the knob may be adjusted to contact blades in different positions on the cone.

It will be seen that the bearing 18, hub 14, tubes 12 and 20 all form an adjustable mounting for the rod 22 in such a way that the mounting is collapsible and expandible toward and away from the blade support means represented by the magnet 38 and cone 36 which rotate with respect to the base 28. It will be also seen that the adjustment of the hub 14 on the bearing 18 permits the sighting portion or knob 26 at the terminal end of the rod 24 to be moved toward and away from the plane in which the blade 34 lies, the said plane extending through the support means represented by the cone 36 and magnets 38 at a certain place.

From the foregoing specification it will become apparent that the invention disclosed will adequately accomplish the functions for which it has been designed and in an economical manner and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent is:

In a tracking arm for a blade balancing tool, the combination which comprises a horizontally disposed spindle, a base in which the spindle is rotatably mounted, means for temporarily retaining the blade on the spindle with the blade positioned to travel in a vertical plane, a bearing integral with and extended from said base and having a horizontally disposed hub on the outer end, a bolt extended through the hub of said bearing and positioned with the axis thereof in a horizontal plane, an arm positioned against one end of the hub of the bearing and through which said bolt extends, said arm having a hub the axis of which is vertically positioned carried on the extended end, a vertically disposed tube extended through the hub on said arm, a telescoping tube extended from the lower end of said vertically disposed tube, a rod having a vertically disposed section and a horizontally disposed section frictionally retained in the vertically disposed tube and carried thereby, and a knob carried by the extended end of the horizontally disposed section of the rod, said knob being positioned to be engaged by a blade whereby the knob is turned to one side by the blade indicating the distance the blade is positioned from a true tracking plane and providing means for correcting positions of the blades.

References Cited in the file of this patent

UNITED STATES PATENTS

| | | |
|---|---|---|
| 491,840 | Field | Feb. 14, 1893 |
| 1,371,281 | Weber | Mar. 15, 1921 |
| 1,553,814 | Hansen | Sept. 15, 1925 |
| 1,977,297 | Weaver | Oct. 16, 1934 |
| 2,075,421 | Bennett | Mar. 30, 1937 |
| 2,095,059 | Donnelly | Oct. 5, 1937 |